United States Patent
Chou et al.

(10) Patent No.: US 8,750,874 B2
(45) Date of Patent: Jun. 10, 2014

(54) HANDOVER METHOD FOR COMMUNICATION NETWORKS

(75) Inventors: Chie-Ming Chou, Taichung County (TW); Chang-Lung Hsiao, Taipei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 763 days.

(21) Appl. No.: 12/034,497

(22) Filed: Feb. 20, 2008

(65) Prior Publication Data

US 2009/0207804 A1    Aug. 20, 2009

(51) Int. Cl.
*H04W 36/00*    (2009.01)

(52) U.S. Cl.
USPC ........... 455/436; 370/331; 370/350; 455/439; 455/442; 455/443; 455/444

(58) Field of Classification Search
USPC ...................... 370/310.2, 328, 331, 338, 350; 455/11.1, 13.1, 15, 431, 432.1, 434, 455/436–444, 455
See application file for complete search history.

(56) References Cited

U.S. PATENT DOCUMENTS

| | | | |
|---|---|---|---|
| 7,031,711 B2 | 4/2006 | Soliman | |
| 2003/0186695 A1* | 10/2003 | Bridges et al. | 455/432 |
| 2005/0128969 A1 | 6/2005 | Lee et al. | |
| 2007/0060048 A1* | 3/2007 | Kang et al. | 455/13.1 |
| 2007/0081507 A1* | 4/2007 | Koo et al. | 370/338 |
| 2007/0086388 A1* | 4/2007 | Kang et al. | 370/331 |
| 2007/0249347 A1* | 10/2007 | Saifullah et al. | 455/436 |
| 2007/0293224 A1* | 12/2007 | Wang et al. | 455/436 |
| 2008/0051078 A1* | 2/2008 | Hong et al. | 455/424 |
| 2008/0108369 A1* | 5/2008 | Visotsky et al. | 455/455 |
| 2008/0125125 A1* | 5/2008 | Choi et al. | 455/436 |
| 2009/0073916 A1* | 3/2009 | Zhang et al. | 370/315 |
| 2010/0248619 A1* | 9/2010 | Senarath et al. | 455/11.1 |

FOREIGN PATENT DOCUMENTS

CN    101009926 A    8/2007

OTHER PUBLICATIONS

Office Action for Chinese Application No. 200910002964.9 dated Nov. 30, 2011.

* cited by examiner

*Primary Examiner* — Dinh P Nguyen
(74) *Attorney, Agent, or Firm* — Alston & Bird LLP

(57) ABSTRACT

A method of performing a handover process in a wireless multi-hop communication network, the method comprising requesting neighborhood communication information regarding channel condition among access stations in the neighborhood of a mobile station, the neighborhood communication information including communication information related to a link between a first station and a second station in the wireless multi-hop communication network, obtaining the communication information related to the link between the first station and the second station, sending the communication information from the first station to a mobile station in the wireless multi-hop communication network, and configuring the mobile station based on the communication information so as to switch the mobile station to the second station.

28 Claims, 13 Drawing Sheets

HANDOVER METHOD FOR COMMUNICATION NETWORKS

BACKGROUND OF THE INVENTION

The present invention relates to methods for performing handover procedures in a communication network. More particularly, the present invention relates to methods for accelerating handover procedures in a communication network.

In a conventional wireless communication network, when the distance between communication parties increases or a shadowing effect occurs, the intensity of signals received at a station may decrease, which in turn may degrade the transmission performance of the communication network, especially when the station is located at or near an edge of coverage of the wireless communication network. To extend the coverage of the wireless communication network and improve the transmission rate, one or more relay station (RS) may be deployed to forward signals between a base station (BS or MR-BS) and a mobile station (MS). In some applications, a relay station may be located within a vehicle to provide its attached mobile stations (e.g. cellular phones used by passengers in the vehicle) higher throughput or maintain connectivity to a base station. Such a relay station may be advantageous in that the distance between the mobile stations and the relay station in the vehicle is almost fixed, no matter whether the vehicle moves or not. Furthermore, the almost fixed distance between the mobile stations and the relay station may facilitate reliable and stable channel quality when the vehicle migrates. However, when a passenger using a mobile station is getting off the vehicle, a fast handover from the relay station to an outside base station may be needed. In such a situation, a conventional handover procedure may not be able to perform a handover in time to avoid disconnection.

Some techniques in the prior art have been developed to resolve this problem. An example of the prior art techniques may be found in U.S. Pat. No. 7,031,711 (hereinafter "the '711 patent") to Samir S. Soliman, entitled "Mobile Communication System With Position Detection To Facilitate Hard Handoff." In the '711 patent, a positioning equipment such as a GPS (Global Positioning System) may be required, which is embedded within a mobile station to facilitate a hard handover (or handoff) procedure. Furthermore, a database of positions may also be required, which is maintained by the mobile station and a base station so as to provide information to track the corresponding mobile trajectory. As a result, the '711 patent may require an additional positioning device to acquire information on location in order to perform a hard handover.

Another example may be found in U.S. Patent Publication number 2005/0128969 (hereinafter "the '969 application) by Min-ho Lee et. al., entitled "Handover Method and Handover Apparatus." The '969 application may provide a method and an apparatus for applying measurement calculation to estimate the moving speed of a mobile station so as to reduce handover latency or packet loss rate when the mobile station moves at a relatively high speed. The apparatus may be designed for use in a media access control (MAC) or physical layer for the handover procedure, and may not be able to reduce the latency or increase transmission performance using a higher layer of mechanism in the communication network.

Still another example may be found in IEEE802.16j-06_026r3-P802.16j Baseline Document, wherein methods of handover procedures related to "Mobile-RS" are specified. These methods may be divided into mobile relay station (Mobile-RS) handover with and without preamble change in dealing with interference issues. Both cases (with and without preamble change) may each be further divided into Mobile-RS handover procedures and attached mobile stations (MSs) handover procedures. A basic concept of these methods resides in reusing legacy 802.16e handover procedures in the conditions where the Mobile-RS may act as an interface to facilitate the handover procedures of its attached MSs. However, the MSs may need to handover once the Mobile-RS to which the MSs are attached handover. Furthermore, latency of the handover may not be reduced significantly.

FIG. 1 is a diagram illustrating a communication network 100. The communication network 100 may include a first sub-network 102 and a second sub-network 104. The first sub-network 102 may include a base station 106, relay stations 108c, 108d, 108e and 108f, and mobile stations 110a, 110b, 110c and 110d. The base station 106 may have a coverage 112, while the relay stations 108c to 108f may respectively have coverage 114c to 114f. The second sub-network 104 may include relay stations 108a and 108b with coverage 114a and 114b, respectively. Furthermore, the relay stations 108c, 108d, 108e and 108f may be used for throughput enhancement of the communication network 100, while the relay stations 108a and 108b may be used for coverage extension of the communication network 100.

Usually, relay stations (RSs) in a wireless communication network may be divided into three types by mobility, namely the fixed-RS, nomadic-RS and mobile-RS. The fixed-RS may refer to an RS mounted at a fixed location. The nomadic RS may refer to an RS which is portable but may not provide service until it is positioned. For these types of relay stations, only mobile stations (MSs) may need to deal with mobility management during operation. The fixed-RS or the nomadic-RS may connect with a stable access station (e.g. an MR-BS), which in turn may be a target access station for the attached MSs of the fixed-RS or the nomadic-RS when the MSs are going to move out of the coverage of the original fixed-RS or nomadic-RS.

Unlike the nomadic-RS, the mobile-RS may provide service during its motion or migration. Accordingly, mobility management may be required for the mobile-RSs and their attached MSs. FIG. 2A and FIG. 2B are diagrams illustrating handover in a mobile-RS. Referring to FIG. 2A, a wireless communication network may include a base station (BS) 200, a mobile-RS 202 and a mobile station (MS) 206. The BS 200 has a coverage 208 and the mobile-RS 202 has a coverage 210. The mobile-RS 202 may be located at a vehicle 204 and thus may move with respect to the BS 200 as the vehicle 204 moves. Moreover, the BS 200 and the mobile-RS 202 may originally communicate with a first wireless link 212 and the mobile-RS 202 and the MS 206 may originally communicate with a second wireless link 214. The mobile-RS 202 may continuously send radio signals such as preamble, MAP or data, to its attached MS 206 to maintain connectivity with the attached MS 206. Moreover, the second wireless link 214 between the mobile-RS 202 and the MS 206 may be stable even if the vehicle 204 moves because the attached MS 206 of the mobile-RS 202 moves with the mobile-RS 202. The MS 206 may not require any handover procedures even when the vehicle 204 moves at a relatively high speed as long as the MS 206 stays in the vehicle 204. The attached MS 206 may be always in the coverage 210 of the mobile-RS 202 when in the vehicle 204, and thus may not need any handover to communicate with other stations, which is an advantage of the mobile-RS 202.

However, as the mobile-RS 202 migrates from the BS 200 to another, power transmitted by the mobile-RS 202 may be interfered with other BSs or RSs and thus the overall system performance may be degraded. To resolve the issue of power interference, in one aspect, the BS 200 may configure the mobile-RS 202 to transmit at a suitable frequency (segment) based on the current location of the mobile-RS 202. However, this change in frequency may trigger the attached MS 206 of the mobile-RS 202 to perform a handover procedure in order to re-synchronize itself with the same access station at a different transmitting frequency, which may incur undesirable overhead for the attached MS 206 and cause the mobile-RS 202 inefficient as compared to the case where the MS 206 is connected with the BS 200 directly without relaying through the mobile-RS 202.

In another aspect, the transmitting power of the mobile-RS 202 may be limited to resolve the issue of power interference. Since the mobile-RS 202 may have a confined radio coverage related to the vehicle 204, the MS 206 may be allowed to communicate with the mobile-RS 202 only when the MS 206 is in the vehicle 204. However, the power of signals of the mobile-RS 202 may decay drastically as a passenger with the MS 206 debarks the vehicle 204. Referring to FIG. 2A, a link 214 between the MS 206 out of the coverage 210 and the mobile-RS 202 may degrade relatively fast. As a result, the MS 206 may lose its connectivity for lack of sufficient response time to perform a handover to switch from the mobile-RS 202 to another station.

It may therefore be desirable to have a handover method for a wireless multi-hop relay communication system for improving the transmission efficiency and capacity of the system.

BRIEF SUMMARY OF THE INVENTION

Examples of the present invention may provide a method of performing a handover process in a wireless multi-hop communication network, the method comprising requesting neighborhood communication information regarding channel condition among access stations in the neighborhood of a mobile station, the neighborhood communication information including communication information related to a link between a first station and a second station in the wireless multi-hop communication network, obtaining the communication information related to the link between the first station and the second station, sending the communication information from the first station to a mobile station in the wireless multi-hop communication network, and configuring the mobile station based on the communication information so as to switch the mobile station to the second station.

Some examples of the present invention may provide a method of performing a handover process in a wireless multi-hop communication network, the method comprising performing an uplink synchronization, obtaining communication information related to a link between a first station and a second station in the wireless multi-hop communication network, broadcasting the communication information to a mobile station in the wireless multi-hop communication network, and configuring the mobile station based on the communication information.

Examples of the present invention may also provide a system for performing a handover process in a wireless multi-hop communication network, the system comprising a first station configured to obtain communication information, the first station having a first radio coverage in the wireless multi-hop communication network, a second station configured to provide the communication information through an uplink synchronization between the first station and the second station, the communication information being related to a link between the first station and the second station, the second station having a second radio coverage in the wireless multi-hop communication network, the second radio coverage being greater than the first radio coverage, and a mobile station within the first radio coverage, the mobile station receiving the communication information and being configured in accordance with the communication information.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
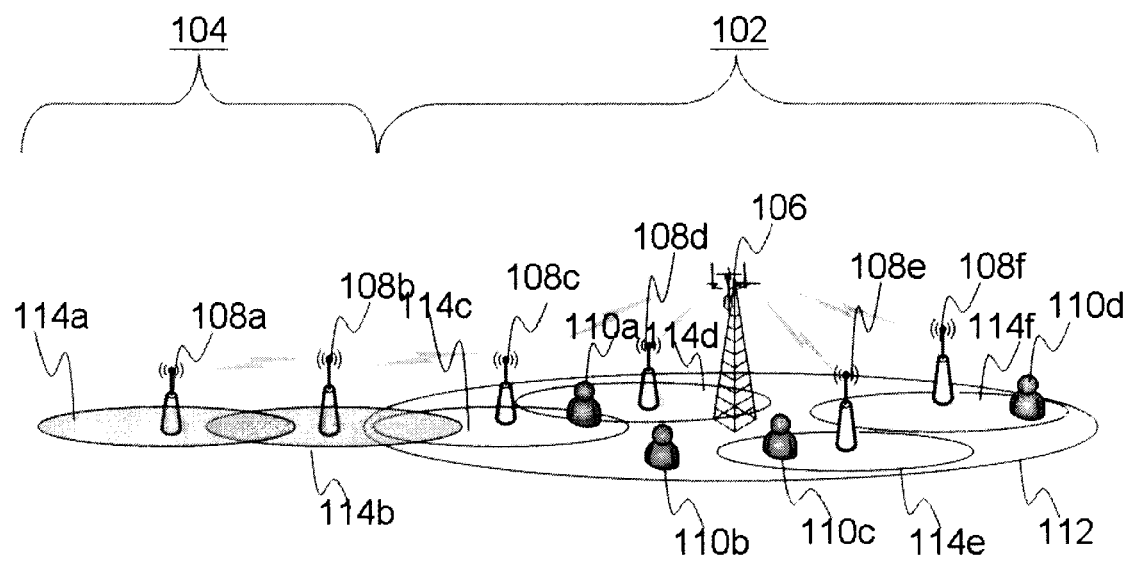
FIG. 1 is a diagram illustrating a communication network.
Figure 2A:
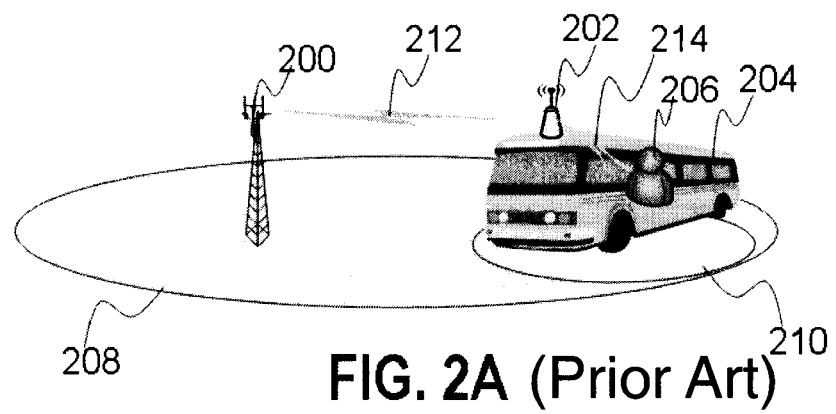
FIG. 2A and FIG. 2B are diagrams illustrating handover in a mobile relay station.
Figure 2B:
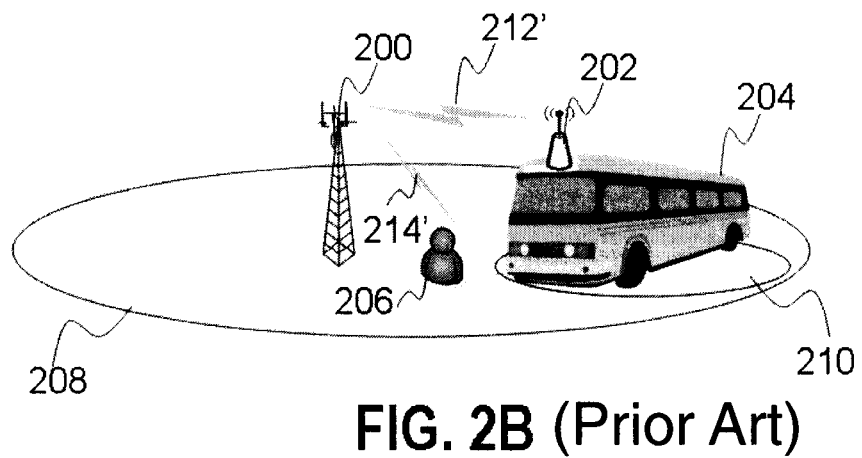
Figure 3:
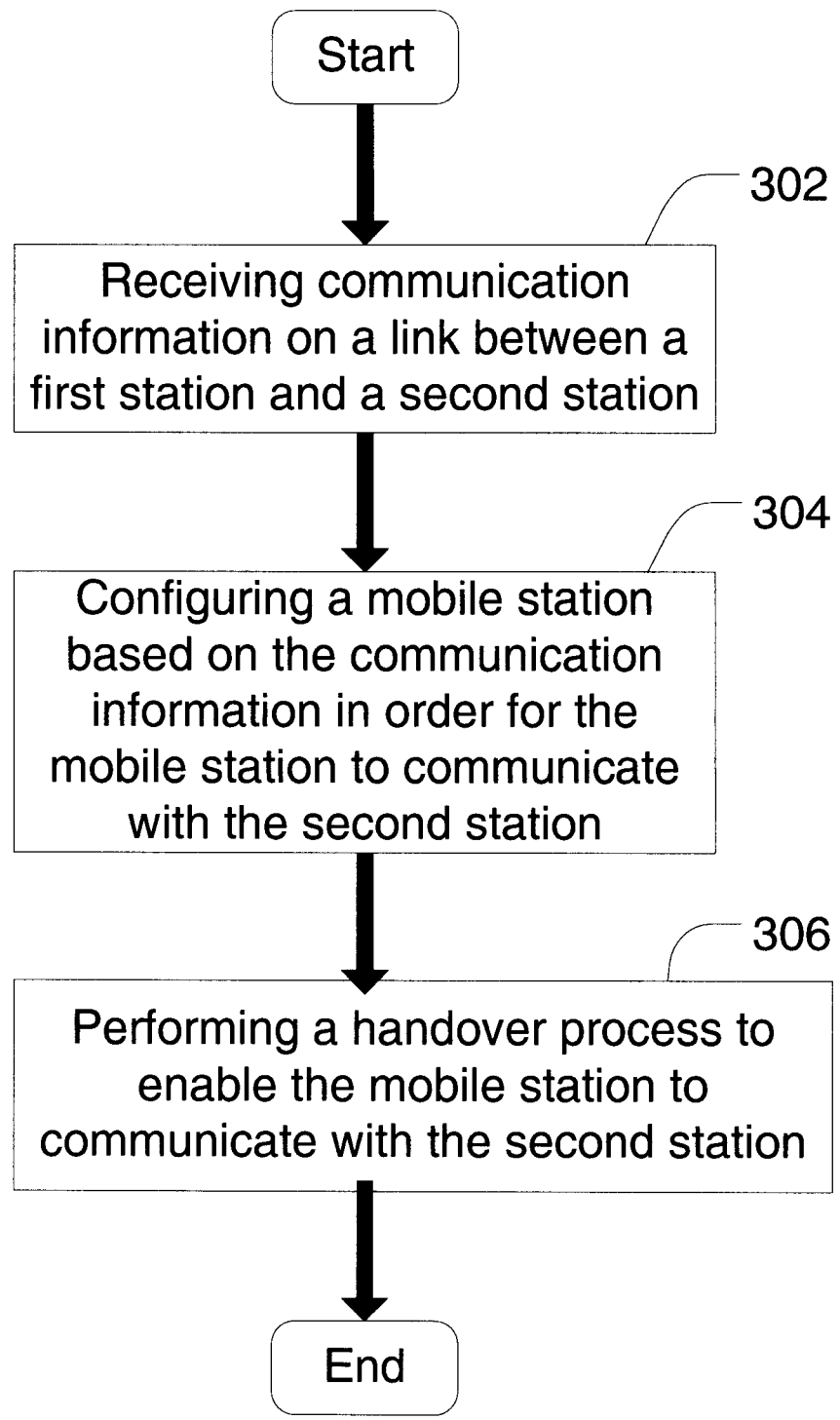
FIG. 3 is a flow diagram illustrating a method for a mobile station to perform handover according to an example of the present invention.

FIG. 3 is a flow diagram illustrating a method for a mobile station (MS) to perform handover according to an example of the present invention. The mobile station may perform handover to switch its communications from communicating with a first station to communicating with a second station. That is, the mobile station may communicate with the first station before performing the handover in order to communicate with the second station. Furthermore, the first station may communicate with the second station while serving the mobile station. Referring to FIG. 3, at step 302, communication information related to a link between the first station and the second station may be received at the mobile station from, for example, the first station, which may be an access station with which the mobile station may be able to communicate. At step 304, the mobile station may be configured in accordance with the communication information in order to communicate with the second station. Next, at step 306, a handover process to allow the mobile station to communicate with the second station may be performed.

In one example, the first station may be a relay station (RS) and the second station may be a base station (BS) with respect to the mobile station (MS). In another example, the first station may be a BS and the second station may be an RS. In an example that a BS is an access station to an RS, which in turn is an access station to an MS, when the MS moves out of the coverage of the RS, a new target station for the MS may be the access station BS to the RS. In such an example, some physical parameters between the RS and the BS may be similar to those between the MS and the new target station (the BS). Accordingly, the MS may take advantage of the communication information such as link parameters used by the first station (the RS) to communicate with the second station (the BS), and configure its transmitter or receiver based on the communication information so as to communicate with the target station (the BS). As a result, there may be no need for the MS to perform a scanning process for collecting link parameters. Moreover, latency in the handover process to switch the MS from the first station to the second station may be shortened or alleviated.

In one example, the communication information may include but is not limited to information on the synchronization between the first station and the second station or the transmission power required for communication between the first station and the second station. For example, the communication information may include timing adjustment, power adjustment and PHY parameters between the first station and the second station. Furthermore, the first station may periodically or continuously broadcast the communication information to the second station without any request from the mobile station.

Figure 4:
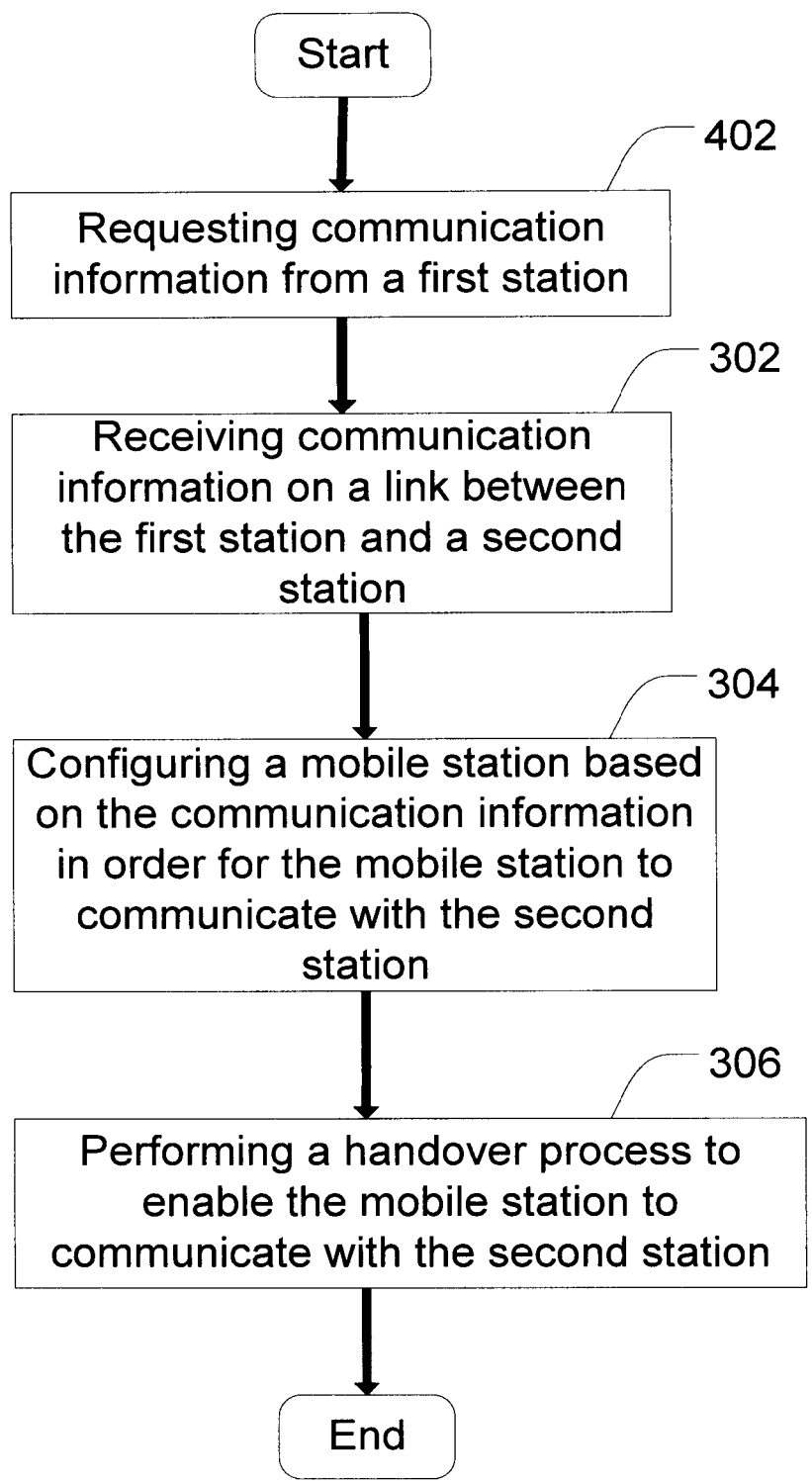
FIG. 4 is a flow diagram illustrating a method for a mobile station to perform handover according to another example of the present invention.

FIG. 4 is a flow diagram illustrating a method for a mobile station to perform handover according to another example of the present invention. The mobile station may perform handover to switch its communication with a first station to a second station if the mobile station moves out of the coverage of the first station, or if the mobile station moves into the coverage of the second station. Referring to FIG. 4, the method may be similar to that described and illustrated with reference to FIG. 3 except that, for example, at step 402 a request for communication information to be sent from the first station may be made at the mobile station prior to receiving the same therefrom at step 302. Specifically, the mobile station may request neighborhood communication information regarding channel condition among access stations in the neighborhood of the mobile station. The neighborhood communication information may include at least communication information related to a link between the first station and the second station. In one example, the mobile station may have initiated a scanning process for the communication information, and the first station may send a control signal to cease the scanning process. Furthermore, the first station may be a relay station (RS) and the second station may be a base station (BS). In other examples, the first station may be a base station and the second station may be a relay station.

Figure 5:
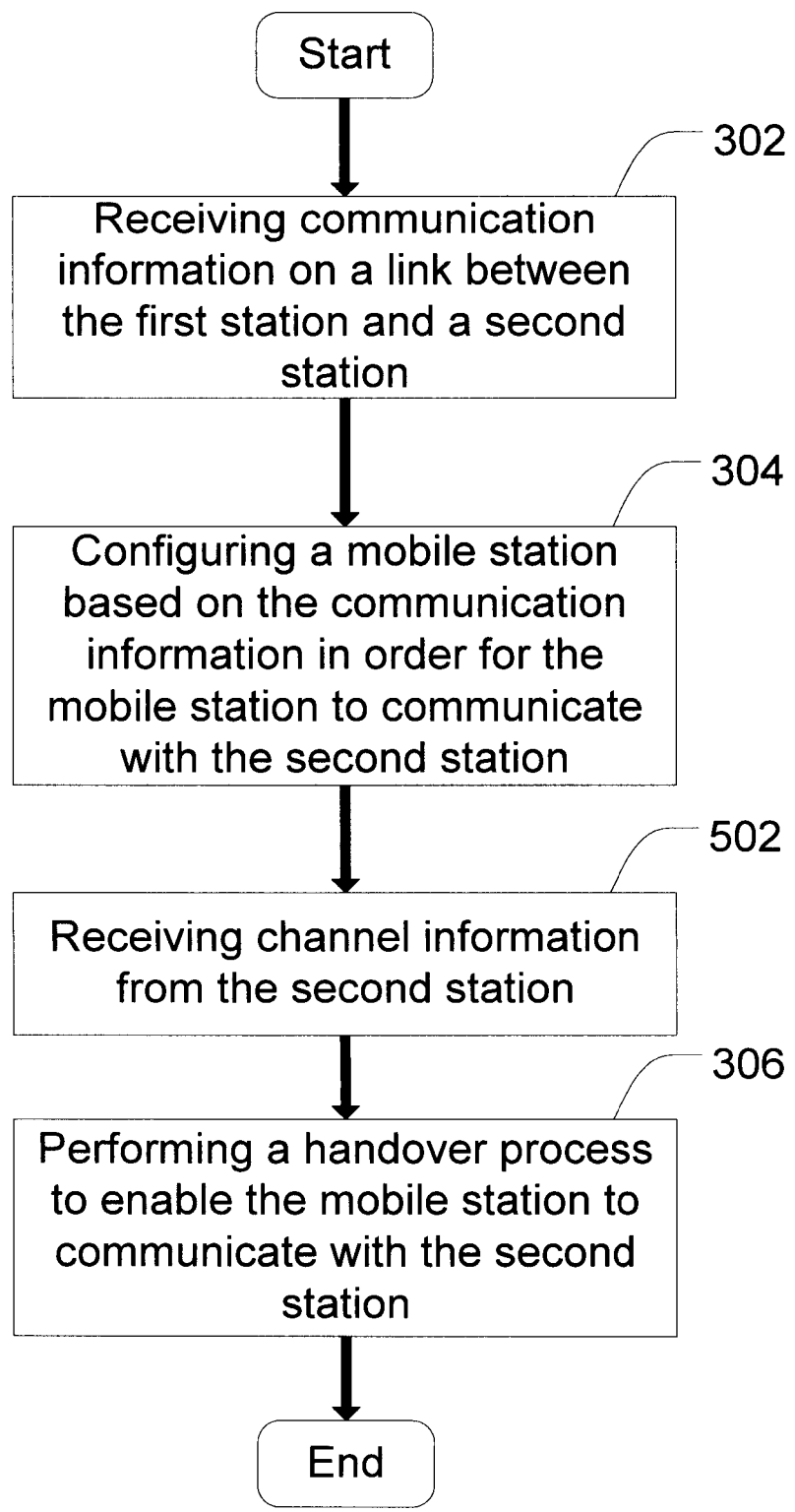
FIG. 5 is a flow diagram illustrating a method for a mobile station to perform handover according to still another example of the present invention.

FIG. 5 is a flow diagram illustrating a method for a mobile station to perform handover according to still another example of the present invention. Referring to FIG. 5, the method may be similar to that described and illustrated with reference to FIG. 3 except that, for example, channel information may be received from the second station at step 502 after the mobile station is configured based on the communication information at step 304. The channel information may be related to a channel allocated by the second station for communicating with the mobile station for the handover. In one example, the channel information may include but is not limited to a first information regarding when the mobile station may start to communicate with the second station. For example, the first information may indicate that after a scheduled delay for "x" data frames, the channel may be ready for communication so that the mobile station may start to communicate with the second station. In still another example, the channel information may include a second information on a frequency range at which the mobile station may communicate with the second station. For example, the second information may indicate a bandwidth allocated for communication over the channel. Moreover, because the channel is allocated before the mobile station performs the handover, the channel may be dedicated for use by the mobile station. As a result, there is no need for the mobile station to compete with other stations for channel bandwidth, advantageously resulting in a contention-free handover process.

Figure 6:
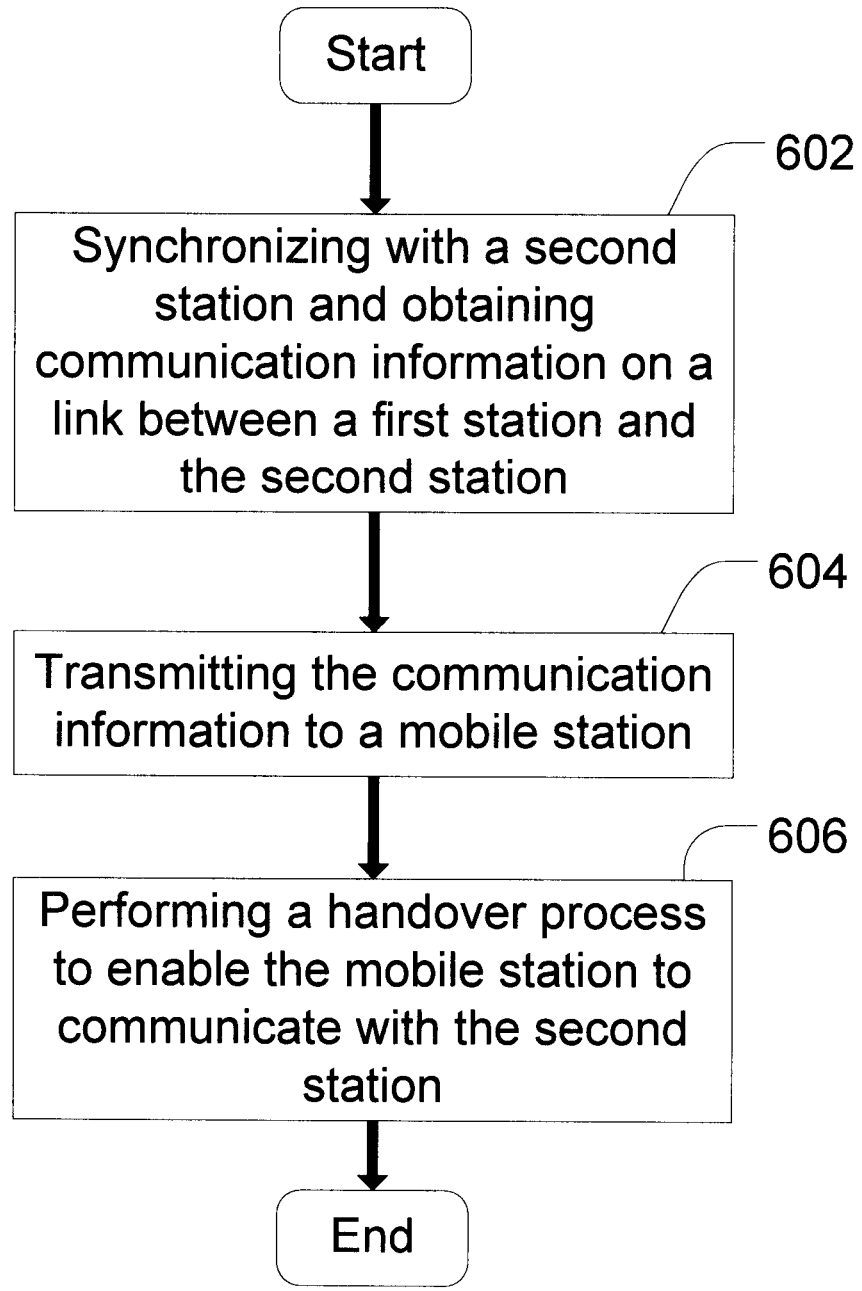
FIG. 6 is a flow diagram illustrating a method for a first station to perform handover for a mobile station according to an example of the present invention.

FIG. 6 is a flow diagram illustrating a method for a first station to perform handover for a mobile station according to an example of the present invention. The first station may be configured to perform handover to switch a mobile station from communicating with the first station to communicating with a second station. Referring to FIG. 6, communication information may be obtained at the first station during an uplink synchronization between the first station and the second station at step 602. The uplink synchronization may be performed through, for example, a ranging process. According to the 802.16 standard, the uplink synchronization may be performed to adjust PHY parameters such as burst profile, modulation scheme and bandwidth during data transmission. At step 604, the communication information may then be transmitted to the mobile station. Next, at step 606, a handover process may be performed to switch the mobile station from communicating with the first station to communicating with the second station. When the mobile station moves out of the coverage of the first station buts remains in the coverage of the second station, the mobile station may request or receive the communicating information from the first station before communicating with the new target station, i.e., the second station. Therefore, there may be no need for the mobile station to perform a scanning process for collecting the communication information during handover, which may reduce the handover latency. In one example, after step 602, a request for scanning from the mobile station may be received. After receiving the scanning request, the first station may send a message to prohibit the mobile station from actually performing any scanning process, and then transmit the communication information to the mobile station to facilitate the handover.

Figure 7:
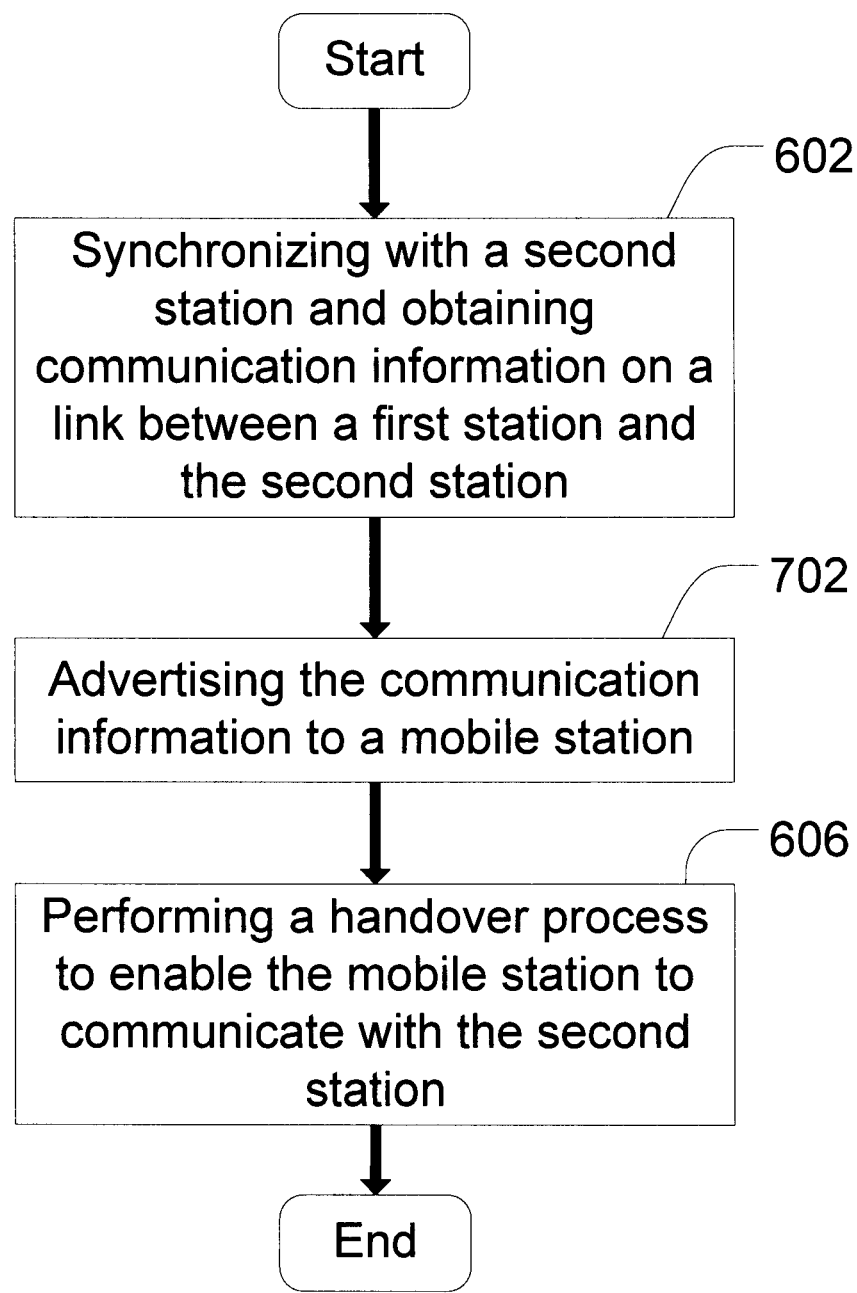
FIG. 7 is a flow diagram illustrating a method for a first station to perform handover for a mobile station according to another example of the present invention.

FIG. 7 is a flow diagram illustrating a method for a first station to perform handover for a mobile station according to another example of the present invention. Referring to FIG. 7, the method may be similar to that described and illustrated with reference to FIG. 6 except that, for example, step 702 replaces the step 604 illustrated in FIG. 6. Specifically, at step 702, the communication information may be sent from the first station to its attached mobile stations and therefore may be accessible to the mobile station in order to facilitate the handover.

Figure 8:
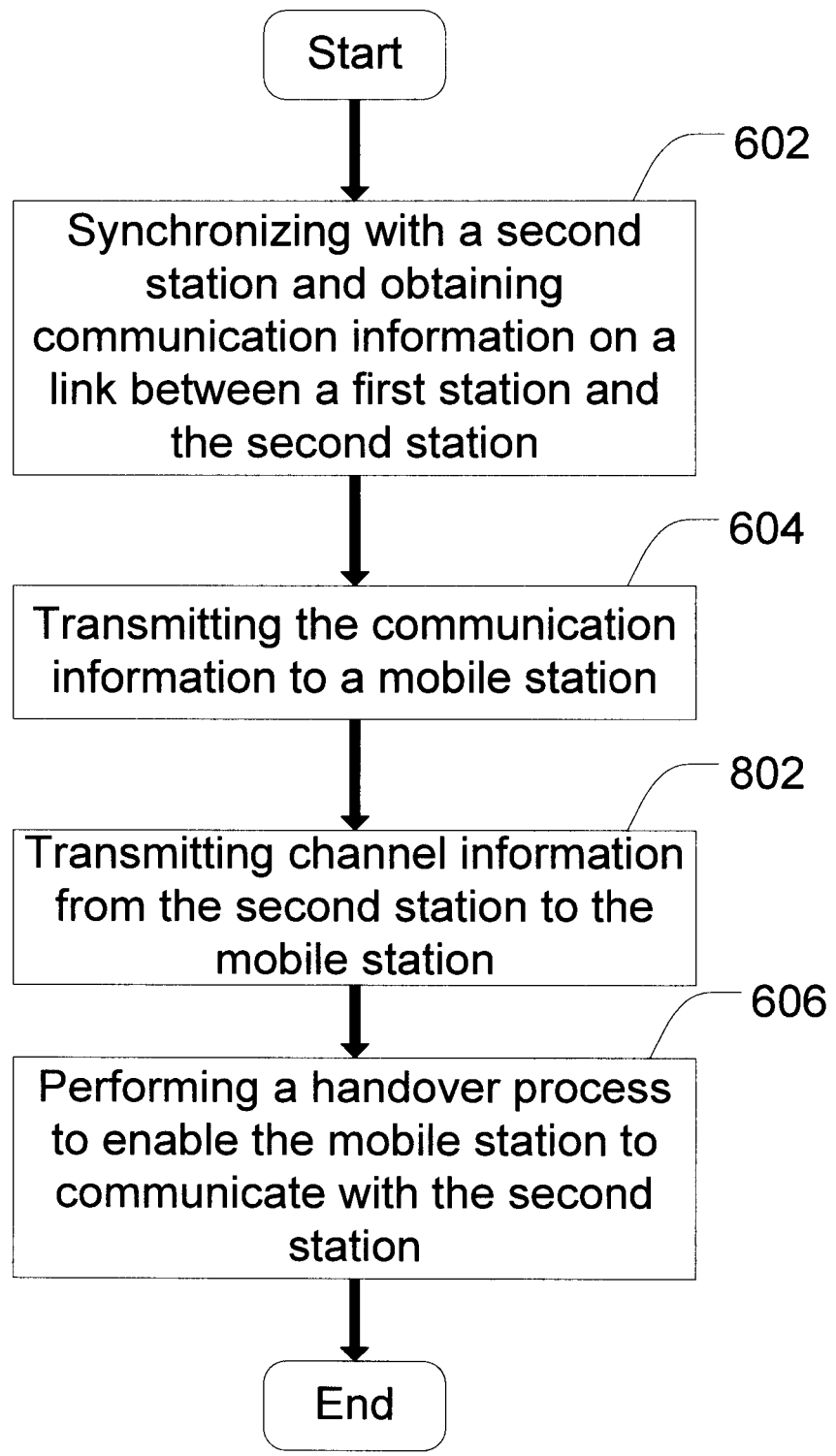
FIG. 8 is a flow diagram illustrating a method for a first station to perform handover for a mobile station according to still another example of the present invention.

FIG. 8 is a flow diagram illustrating a method for a first station to perform handover for a mobile station according to still another example of the present invention. Referring to FIG. 8, the method may be similar to that described and illustrated with reference to FIG. 6 except that, for example, step 802 may be performed after the step 604 illustrated in FIG. 6. Specifically, after transmitting the communication information to the mobile station at step 604, channel information related to a link between the first station and the second station may be transmitted from the first station to the mobile station at step 802 to facilitate a contention-free handover process.

Figure 9:
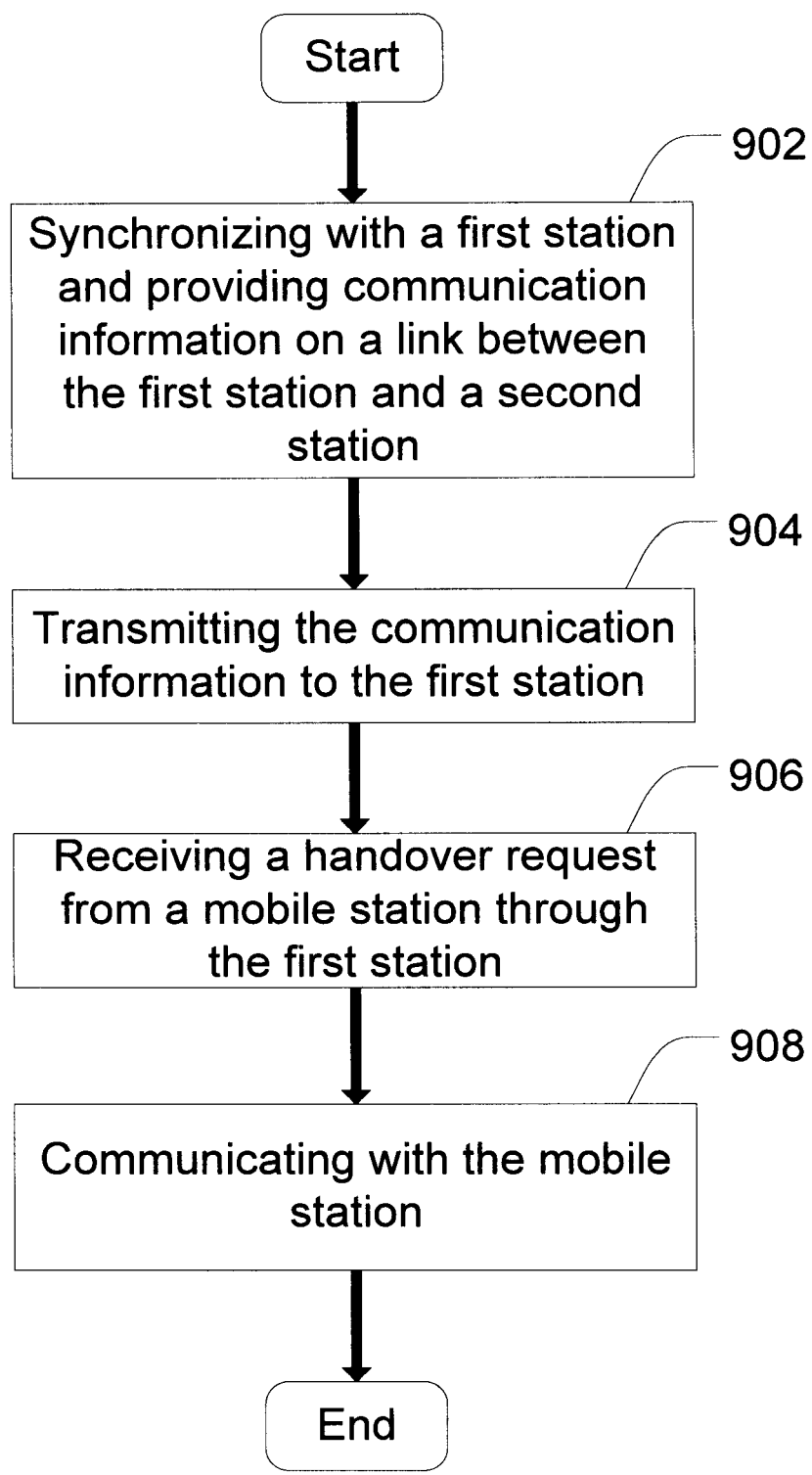
FIG. 9 is a flow diagram illustrating a method for a second station to perform handover for a mobile station according to yet another example of the present invention.

FIG. 9 is a flow diagram illustrating a method for a second station to perform handover for a mobile station according to an example of the present invention. Referring to FIG. 9, communication information may be provided from the second station during an uplink synchronization between a first station and the second station at step 902. The communication information may be transmitted to the first station at step 904. Subsequently, a request for handover sent from the mobile station through the first station may be received at the second station at step 906. Next, a handover process may be performed to enable the mobile station to communicate with the second station at step 908.

Figure 10:
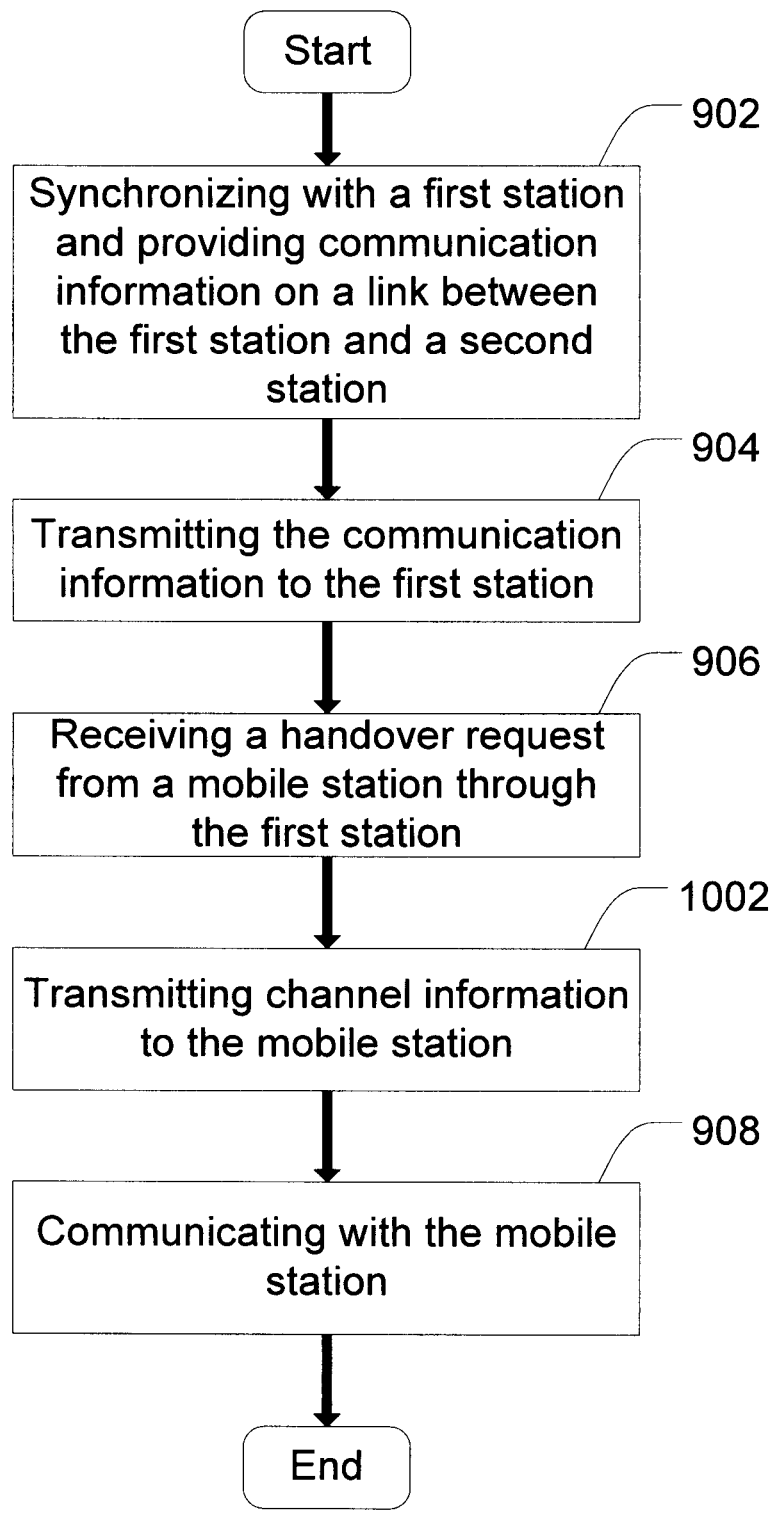
FIG. 10 is a flow diagram illustrating a method for a second station to perform handover for a mobile station according to an example of the present invention.

FIG. 10 is a flow diagram illustrating a method for a second station to perform handover for a mobile station according to another example of the present invention. Referring to FIG. 10, the method may be similar to that described and illustrated with reference to FIG. 9 except that, for example, step 1002 may be performed after the step of 906 illustrated in FIG. 9. Specifically, after receiving a handover request from the mobile station at step 906, channel information related to a link between the first station and the second station may be transmitted from the second station to the mobile station at step 1002 to facilitate a contention-free handover process.

Figure 11:
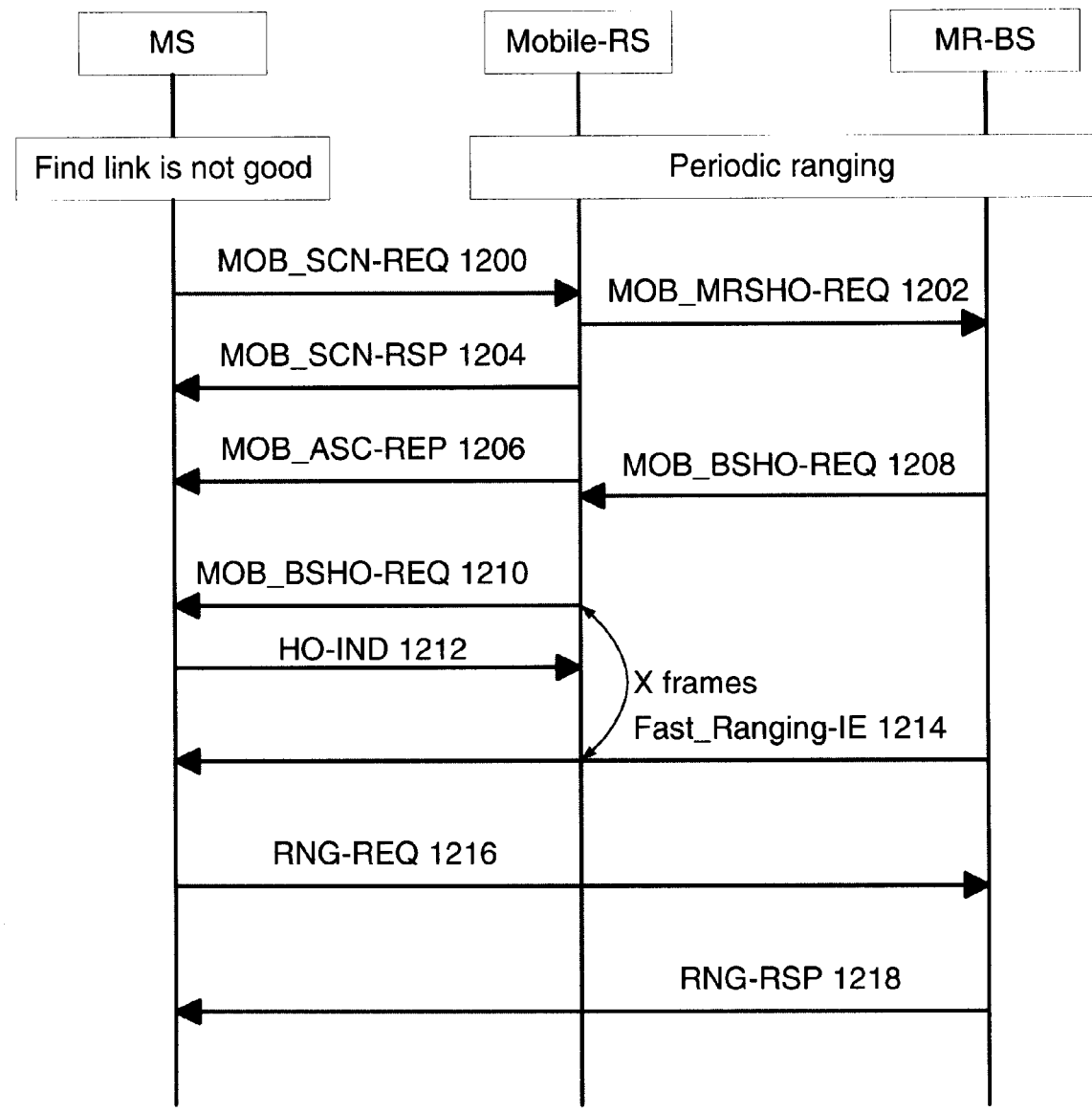
FIG. 11 is a flow chart illustrating signaling flow of a method for performing handover for a mobile station according to an example of the present invention.

FIG. 11 is a flow chart illustrating signaling flow of a method for performing handover for a mobile station (MS) according to an example of the present invention. Referring to FIG. 11, the signaling may concern the mobile station (MS), a mobile relay station (mobile-RS) and a base station (MR-BS). The MS may send a scanning request "MOB_SCN-REQ" at step 1200 to the mobile-RS when the MS detects an undesirable link quality, while the mobile-RS and MR-BS are periodically performing a ranging procedure. The mobile-RS may then send a handover request "MOB_MRSHO-REQ" at step 1202 to the MR-BS, which may mean that the MS is going to leave its access station, i.e., the mobile-BS. The mobile-RS may send a response "MOB_ASC-REP" at step 1204 to the MS. In the response, a parameter "scanning duration" may be set to zero (0), which means that no scanning process is required. Because the mobile-RS sets the scanning duration of a scanning process to zero, the MS may skip or omit the scanning process.

Next, the mobile-RS may send an association report "MOB_ASC_REP" at step 1206 to the MS. In one example, the association report "MOB_ASC_REP" may include communication information on offset adjustment for the MS to configure its transmitter or receiver in order for communicating with the MR-BS. Furthermore, the offset adjustment information may include transmission power or timing information.

The MR-BS may then send a handover response "MOB_B-SHO-REQ" at step 1208 to the mobile-RS, which in turn may pass the handover response "MOB_BSHO-REQ" at step 1210 to the MS, indicating that a target station for the MS (in the present example the MR-BS) is ready to communicate with the MS. The handover request "MOB_BSHO-REQ" may include channel information about a channel allocated by the second station for communicating with the mobile station for the handover. In one example, the channel information may include but is not limited to one or more of a first information regarding when the mobile station may start to communicate with the second station or a second information on a frequency range at which the mobile station may communicate with the second station.

The MS may reply a handover indication "HO-IND" at step 1212 to the mobile-RS in response to the "MOB_BSHO-REQ" message. The MR-BS may transmit a message "Fast_Ranging-IE" including a fast ranging information element at step 1214 to the MS, which in turn may send a ranging request "RNG-REQ" at step 1216 to the MR-BS. The MR-BS may send a ranging response "RNG-RSP" at step 1218 to the MS to complete the handover procedure. After receiving the "MOB_BSHO-REQ" message at step 1210, the MS may send the "HO-IND" message at step 1212 as an acknowledge to signal the MR-BS that communication after the handover may start on time, at which the MR-BS may begin to perform an uplink synchronization. The "Fast_Ranging-IE" message may further include information about the channel such as the frequency or bandwidth available for the MS in the communication after the handover. Subsequently, the MR-BS and the MS may perform a ranging procedure by sending the "RNG-REQ" message at step 1216 from the MS to the MR-BS to request for ranging and replying the "RNG-RSP" message at step 1218 from the MR-BS as an acknowledgement. In one example, if necessary, the MR-BS may reassign a new connection identifier (CID) to the MS.

Figure 12:
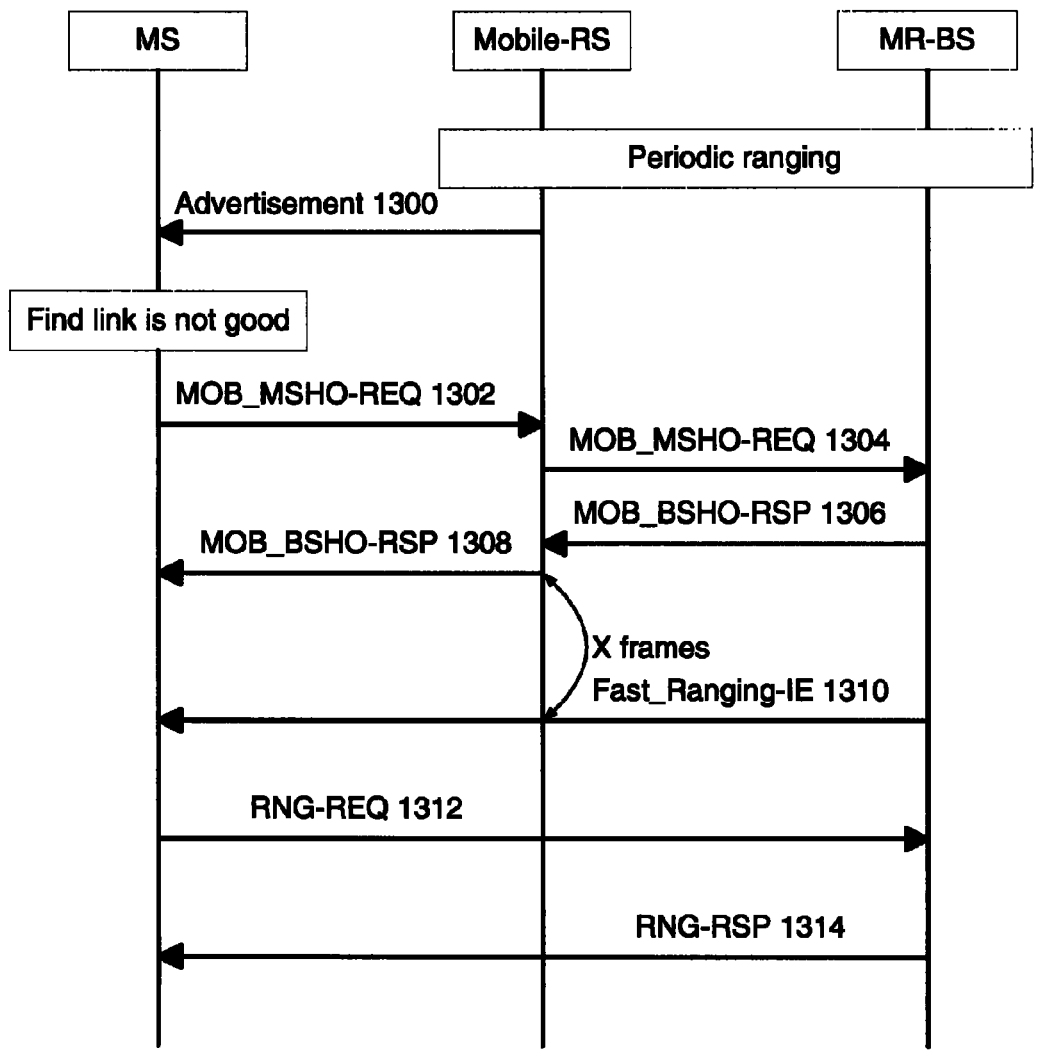
FIG. 12 is a flow chart illustrating signaling flow of a method for performing handover for a mobile station according to another example of the present invention.

FIG. 12 is a flow chart illustrating signaling flow of a method for performing handover for a mobile station according to another example of the present invention. Referring to FIG. 12, an MR-BS may be periodically ranging with a mobile-RS. The mobile-RS may broadcast an advertisement at step 1300, which may include an identifier of its access station and associated PHY parameters. An attached MS of the mobile-RS may store the advertisement. The MS, instead of sending a scanning request "MOB_SCN-REQ" (step 1200) as previously described with reference to FIG. 11, may send a handover request "MOB_MSHO-REQ" at step 1302 to the mobile-RS if the MS detects an undesirable link quality. The mobile-RS may forward the handover request "MOB_MSHO-REQ" at step 1304 to the MR-BS to signal the MR-BS that the attached MS is asking for handover. In response to the handover request, the MR-BS may send a handover response "MOB_BSHO-RSP" at step 1306 to the mobile-RS, which in turn may forward the handover response "MOB_BSHO-RSP" at step 1308 to the MS. The MR-BS and the MS may perform a ranging procedure by sending a message "Fast_Ranging-IE" at step 1310 from the MR-BS after "x" data frames the handover response "MOB_BSHO-RSP" was sent, replying a ranging request "RNG-REQ" from the MS at step 1312 to the MR-BS, and sending a ranging response "RNG-RSP" from the MR-BS at step 1314 to the MS.

Examples of the present invention may provide a method for a relay station (RS) to facilitate handover procedures for its attached mobile stations (MSs) when one or more of the attached MSs moves out of the radio coverage of the RS and enters the coverage of a base station (BS) with which the RS may originally communicate. In the examples, the RS may act as an agent for the attached MSs to acquire or reuse communication information on network topology, physical parameters (e.g. signal-to-interference ratio) and channel quality, which may be originally used in a communication link between the RS and the BS. As a result, the present invention may facilitate a handover procedure for the attached MS to switch in communication from the RS to the BS (a target station originally communicates with the RS). Furthermore, the disadvantages of the prior art techniques as previously described that, for example, handover may not be performed in time and interference with neighboring stations may incur, may be overcome or alleviated by the present invention.

Figure 13:
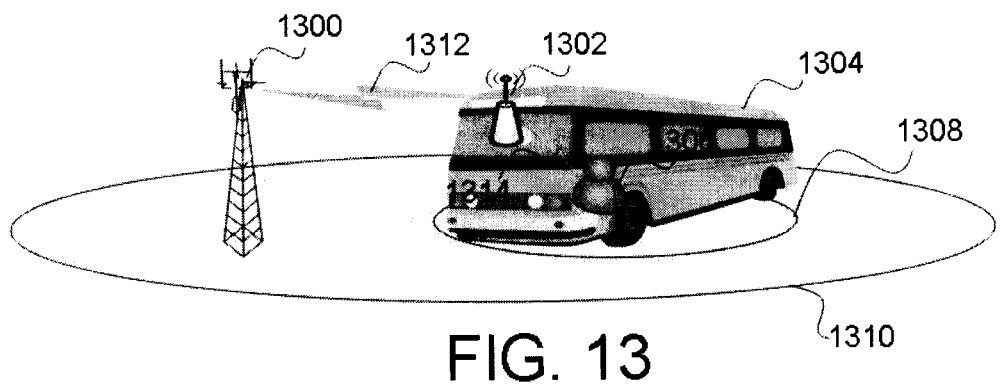
FIG. 13 is a diagram illustrating a communication system according to an example of the present invention.

FIG. 13 is a diagram illustrating a communication system according to an example of the present invention. Referring to FIG. 13A, the communication system may include a base station (MR-BS) 1300, a mobile-RS 1302 and a mobile station (MS) 1306. The base station 1300 has a coverage 1310 and the mobile-RS 1302 has a coverage 1308. The mobile station 1306 may be located at a vehicle 1304 and within the coverage 1308, which in turn within the coverage 1310. The mobile-RS 1302 may move as the vehicle 1304 moves with respect to the base station 1300. Moreover, the base station 1300 and the mobile-RS 1302 may communicate with a first wireless link 1312 and the mobile-RS 1302 and the mobile station 1306 may communicate with a second wireless link 1314.

Also referring to FIG. 11, according to an example of the present invention, the mobile-RS 1302 and MR-BS 1300 are periodically performing a ranging procedure. The mobile-RS 1302 may receive the "MOB_SCN-REQ" from the MS 1306 over the second wireless link 1314 when the MS 1306 detects an undesirable link quality. The mobile-RS 1302 may then send the handover request "MOB_MRSHO-REQ" to the MR-BS 1300 over the first wireless link 1312, which may mean that the MS 1306 is going to leave its access station, i.e., the mobile-RS 1302. The mobile-RS 1302 may send the response "MOB_ASC-REP" over the first wireless link 1312 with the parameter "scanning duration" being set to zero (0) to the MS 1306 so that the MS 1306 may skip or omit the scanning process. Subsequently, the mobile-RS 1302 may send the association report "MOB_ASC_REP" including information on offset adjustment for the MS 1306 to configure its transmitter or receiver in order for communicating with the MR-BS 1300 to the MS 1306 over the first wireless link 1312.

After receiving the handover response "MOB_BSHO-REQ" from the MR-BS 1300 over the first wireless link 1312, the mobile-RS 1302 may pass the handover response "MOB_BSHO-REQ" including the channel information for the handover to the MS 1306 over the second wireless link 1314, indicating that a target station for the MS 1306 (in the present example the MR-BS 1300) is ready to communicate with the MS 1306. Later, the mobile-RS 1302 may receive the handover indication "HO-IND" from the MS 1306 in response to the "MOB_BSHO-REQ" message over the second wireless link 1314. The MR-BS 1300 and the MS 1306 may then start the ranging procedure to complete the handover process.

Also referring to FIG. 12, according to another example of the present invention, the mobile-RS 1302 may be periodically ranging with the MR-BS 1300, which in turn may broadcast the advertisement including the identifier of its access station and associated PHY parameters. Furthermore, the MS 1306 may store the advertisement. The mobile-RS 1302 may receive the handover request "MOB_MSHO-REQ" from the MS 1306 over the second wireless link 1314 if the MS 1306 detects an undesirable link quality. The mobile-RS 1302 may forward the handover request "MOB_MSHO-REQ" to the MR-BS 1300 over the first wireless link 1312 to inform the MR-BS 1300 that the MS 1306 is asking for handover. The mobile-RS 1302 may receive the handover response "MOB_BSHO-RSP" from the MR-BS 1300 over the first wireless link 1312, and then the mobile-RS 1302 may forward the handover response "MOB_BSHO-RSP" over the second wireless link 1314 to the MS 1306. Subsequently, the MR-BS 1300 and the MS 1306 may start to perform a ranging procedure to complete the handover process.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method for a mobile station to perform a handover process in a wireless multi-hop communication network, the method comprising:
    requesting neighborhood communication information regarding channel condition among access stations in a neighborhood of the mobile station, the neighborhood communication information being requested in an instance in which the mobile station is served by a first station in the wireless multi-hop communication network and wherein the first station is mounted in a vehicle;
    requesting a scanning process, and in response thereto, receiving a messaging to reject the scanning process, the messaging setting a duration of the scanning process to zero;
    receiving at the mobile station in response to the request, communication information related to a link between the first station and a second station in the wireless multi-hop communication network, the communication information having been obtained by the first station during an uplink synchronization with the second station; and configuring the mobile station to switch from the first station to the second station based on the received communication information.

2. The method of claim 1 further comprising:
preparing a request for a handover process for transmission to the second station via the first station; and
participating in the handover process after configuring the mobile station.

3. The method of claim 1, wherein requesting neighborhood communication information includes requesting neighborhood communication information in an instance in which the mobile station is served by the first station having a radio coverage to support wireless communications with the mobile station within the vehicle.

4. The method of claim 1 further comprising:
receiving channel information after the mobile station is configured, wherein the channel information relates to a channel allocated to the mobile station for communication with the second station.

5. The method of claim 4, wherein the channel information includes information regarding when the mobile station is allowed to communicate with the second station.

6. The method of claim 4, wherein the channel information includes information on a bandwidth at which the mobile station is allowed to communicate with the second station.

7. A method of performing a handover process in a wireless multi-hop communication network, the method comprising:
performing an uplink synchronization between a first station and a second station in the wireless multi-hop communication network;
obtaining during the uplink synchronization, communication information related to a link between the first station and the second station;
sending a messaging to reject a scanning process, the messaging setting a duration of the scanning process to zero; and
broadcasting the communication information to a mobile station in the wireless multi-hop communication network, thereby permitting configuration of the mobile station to switch from the first station to the second station based on the communication information, wherein obtaining and broadcasting the communication information occur in an instance in which the first station is mounted in a vehicle.

8. The method of claim 7 further comprising:
receiving a request for a handover process directly or indirectly from the mobile station; and
participating in the handover process after obtaining the communication information.

9. The method of claim 7, wherein obtaining and broadcasting the communication information occur in an instance in which the first station is providing access to the mobile station, and the second station is providing access to the first station.

10. The method of claim 7, wherein obtaining and broadcasting the communication information occur in an instance in which the first station has a radio coverage to support wireless communications with the mobile station within the vehicle.

11. The method of claim 7 further comprising:
preparing channel information for transmission to the mobile station after the mobile station is configured, wherein the channel information relates to a channel allocated to the mobile station for communication with the second station.

12. The method of claim 11, wherein the channel information includes information regarding when the mobile station is allowed to communicate with the second station.

13. The method of claim 11, wherein the channel information includes information on a bandwidth at which the mobile station is allowed to communicate with the second station.

14. The method of claim 1, wherein configuring the mobile station includes configuring the mobile station to synchronize with the second station based on the communication information.

15. An apparatus for performing a handover process in a wireless multi-hop communication network, the apparatus comprising a mobile station in the wireless multi-hop communication network, the mobile station being configured to at least:
request neighborhood communication information regarding channel condition among access stations in a neighborhood of the mobile station, the neighborhood communication information being requested in an instance in which the mobile station is served by a first station in the wireless multi-hop communication network and wherein the first station is mounted in a vehicle;
request a scanning process, and in response thereto, receive a messaging to reject the scanning process, the messaging setting a duration of the scanning process to zero;
receive in response to the request, communication information related to a link between the first station and a second station in the wireless multi-hop communication network, the communication information having been obtained by the first station during an uplink synchronization with the second station; and
configure the mobile station to switch from the first station to the second station based on the communication information.

16. The apparatus of claim 15, wherein the mobile station is further configured to at least:
prepare a request for a handover process for transmission to the second station via the first station; and
participate in the handover process after configuring the mobile station.

17. The apparatus of claim 15, wherein the mobile station is configured to request the neighborhood communication information in an instance in which the mobile station is served by the first station having a radio coverage to support wireless communications with the mobile station within the vehicle.

18. The apparatus of claim 15, wherein the mobile station is further configured to at least:
receive channel information after the mobile station is configured to switch from the first station to the second station, wherein the channel information relates to a channel allocated to the mobile station for communication with the second station.

19. The apparatus of claim 18, wherein the channel information includes information regarding when the mobile station is allowed to communicate with the second station.

20. The apparatus of claim 18, wherein the channel information includes information on a bandwidth at which the mobile station is allowed to communicate with the second station.

21. The apparatus of claim 15, wherein the mobile station being configured to configure the mobile station to switch from the first station to the second station includes being configured to configure the mobile station to synchronize with the second station based on the communication information.

22. An apparatus for performing a handover process in a wireless multi-hop communication network, the apparatus comprising a first station or a second station in the wireless multi-hop communication network, the first station or the second station being configured to at least:

perform an uplink synchronization between the first station and the second station in the wireless multi-hop communication network;

obtain during the uplink synchronization, communication information related to a link between the first station and the second station;

send a messaging to reject a scanning process, the messaging setting a duration of the scanning process to zero; and broadcast the communication information to a mobile station in the wireless multi-hop communication network, thereby permitting configuration of the mobile station to switch from the first station to the second station based on the communication information, wherein the first station or the second station is configured to obtain and broadcast the communication information in an instance in which the first station is mounted in a vehicle.

23. The apparatus of claim 22, wherein the first station or the second station is further configured to at least:

receive a request for a handover process directly or indirectly from the mobile station; and participate in the handover process after obtaining the communication information.

24. The apparatus of claim 22, wherein the first station or the second station is configured to obtain and broadcast the communication information in an instance in which the first station is providing access to the mobile station, and the second station is providing access to the first station.

25. The apparatus of claim 22, wherein the first station or the second station is configured to obtain and broadcast the communication information in an instance in which the first station has a radio coverage to support wireless communications with the mobile station within the vehicle.

26. The apparatus of claim 22, wherein the first station or the second station is further configured to at least:

prepare channel information for transmission to the mobile station after the mobile station is configured, wherein the channel information relates to a channel allocated to the mobile station for communication with the second station.

27. The apparatus of claim 26, wherein the channel information includes information regarding when the mobile station is allowed to communicate with the second station.

28. The apparatus of claim 26, wherein the channel information includes information on a bandwidth at which the mobile station is allowed to communicate with the second station.

* * * * *